Sept. 6, 1960      L. O'NEIL      2,951,588

LOCKABLE TIRE RACK

Filed April 24, 1959      2 Sheets-Sheet 1

INVENTOR
LEONARD O'NEIL
by
ATTORNEY

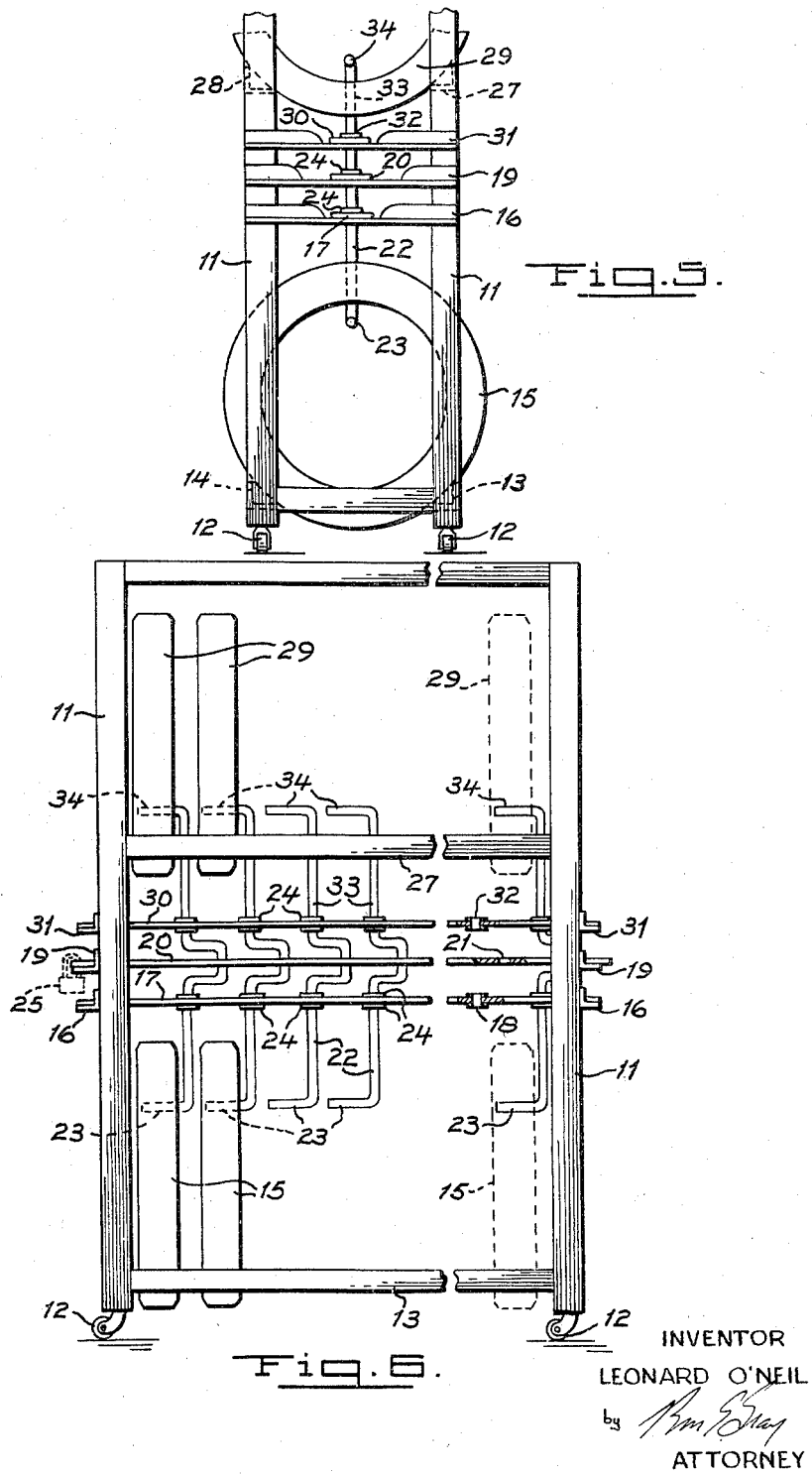

United States Patent Office 2,951,588
Patented Sept. 6, 1960

2,951,588

LOCKABLE TIRE RACK

Leonard O'Neil, Mulgrave, Nova Scotia, Canada

Filed Apr. 24, 1959, Ser. No. 808,658

Claims priority, application Canada May 13, 1958

4 Claims. (Cl. 211—4)

This invention relates to a rack for supporting and displaying vehicular tires which is capable of being locked to prevent the unauthorized removal of any tire.

Vehicle tires are commonly displayed at service stations or other retail outlets on some form of rack. Particularly where such racks are displayed out of doors, the problem of avoiding unauthorized removal of the tires, is encountered. A common practice to prevent removal of the tires is to draw a chain, fastened at one end to the frame of the rack, through the centre of all the tires on the rack, locking the free end of the chain to the frame with a padlock or other locking means. This is an awkward method of securing the tires since the chain must be rethreaded through the centre of the tires each time a tire is removed from any position other than the end position nearest the free end of the chain. Since tires of different sizes are frequently supported on one rack, it is not possible to continually remove the last tire on the rack.

It is, therefore, the object of the present invention to provide a rack having locking means whereby a plurality of vehicular tires may be supported and retained against unauthorized removal, yet simply freed for the removal of one or more tires upon sale or other authorized use and the remaining tires simply relocked after such removal.

The invention will hereafter be described with reference to a particular embodiment illustrated in the accompanying figures, in which Figure 1 is a perspective view of an embodiment of the invention adapted to support one row of tires;

Figure 5 is an end elevation with a portion of framework omitted, of a further embodiment of the invention in which two rows of vehicular tires may be accommodated on a single rack;

Figure 6 is a shortened side elevation view of the double-banked rack of Figure 5.

Figure 4:
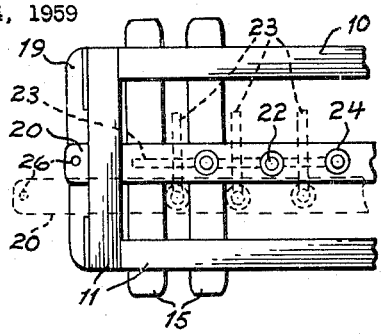
Figure 4 is a plan view of a portion of the rack of Figure 1 showing the rack both in "locked" and "open" positions.

By reference to the drawings, and initially to Figures 1, 2, 3 and 4, it will be seen that the lockable tire rack according to the present invention includes a framework 10 constructed from vertically and horizontally disposed angles 11. The framework is mounted on castors 12 to facilitate its movement from place to place.

At opposite sides of the framework 10 of the rack are fixed parallel, horizontally disposed supporting members 13, 14 spaced from one another a distance less than the diameter of the smallest sized tire to be carried on the rack. On the supporting members 13, 14 the tires 15 are supported vertically on their treaded edges side by side without requiring any other support means. In this way a number of tires can be supported and displayed side by side on a rack a few feet in length.

On angles 16 mounted across each end of the framework 10 of the rack is fixed a horizontally disposed guide bar 17. The guide bar 17 is provided with vertical holes 18 spaced in a line along its length, each from another a distance greater than the breadth of tire to be supported on the rack. Also supported on, though not fixed to, the framework by angles 19 is a second bar, designated herein as the locking bar 20 and situated above and parallel to the guide bar 17. The angles 16 and 19 are so positioned on the framework 10 that the associated guide bar 17 and locking bar 20 will not interfere with the removal of tires from the rack.

Like the guide bar 17, the locking bar 20 is provided with a correspondingly spaced row of vertical holes 21 along its length. Through the holes in the guide and locking bars pass vertical locking arms 22. These locking arms are formed from a material which, once formed, will resist bending by hand. One such material that has been found suitable is rodstock steel. Each locking arm is formed so that the portion which passes through the locking bar is bent so that the vertical axis of the arm at the locking bar is eccentric to the vertical axis of the said arm at the guide bar. Thus as is clearly seen in Figure 2 the upper end of any arm is bent from the vertical to the horizontal and then at the upper end bent vertically again in order to pass through the hole in the locking bar. The end of each locking arm 22 remote from the guide bar and locking bar is bent approximately 90° from the vertical to form the tire locking portion or end 23. By selection of the length of the arm 22 or positioning of the guide bar 17, the locking portion 23 of the arm 22 is so positioned that the locking end 23 will be located within the inner circumference of the tire 15 in its supported vertical position in the rack. In this way when the arm 22 is in locking position the removal of the tire will be prevented by the locking portion 23. There must also be sufficient clearance between the locking end 23 of the arm and the inner circumference or rim bead of the tire to allow the locking end to be rotated at least 90° from a position at right angles to the side wall of the tire to a position parallel to the side wall. The locking end 23 of the arm should be long enough to approach but not interfere with the vertical portion of the adjoining locking arm.

To prevent vertical movement of the locking arm, washers 24 or similar holding means such as cotter pins, are attached to the arm immediately above the locking bar 20 and immediately below the guide bar 17. Other equally effective means of restricting vertical movement of the locking arms will suggest themselves.

It will be seen that since the guide bar is fixed to the framework, the locking arm must rotate about its vertical axis passing through the guide bar when the locking bar is moved. When the locking bar is moved it moves in a horizontal rotary manner with a radius of movement equal to the distance between the vertical axis of the locking arm where it passes through the guide bar and the vertical axis of the locking arm where it passes through the locking bar. If a plurality of locking arms are bent in an identical manner and mounted in an identical way, it will be seen that the locking bar may be moved so that the horizontal locking ends of all arms are in one straight line parallel to the fixed guide bar and perpendicular to the side walls of the tires supported vertically on the framework. Similarly, it is possible to rotate the locking ends so that they are parallel to each other, parallel to the side walls of the supported vertical tires and perpendicular to the horizontal guide bar.

Figure 2:
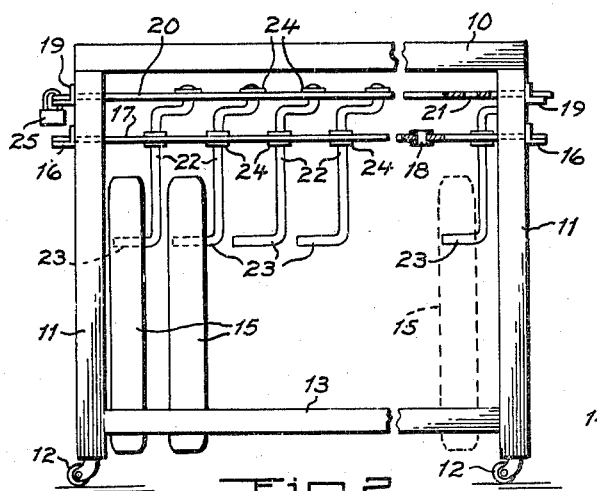
Figure 2 is a side elevation view of a rack such as is illustrated in Figure 1 showing a plurality of tires locked on the rack.
Figure 3:
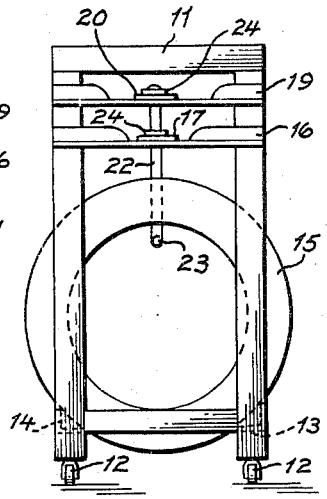
Figure 3 is an end elevation view of the rack of Figure 1.
Figure 1:
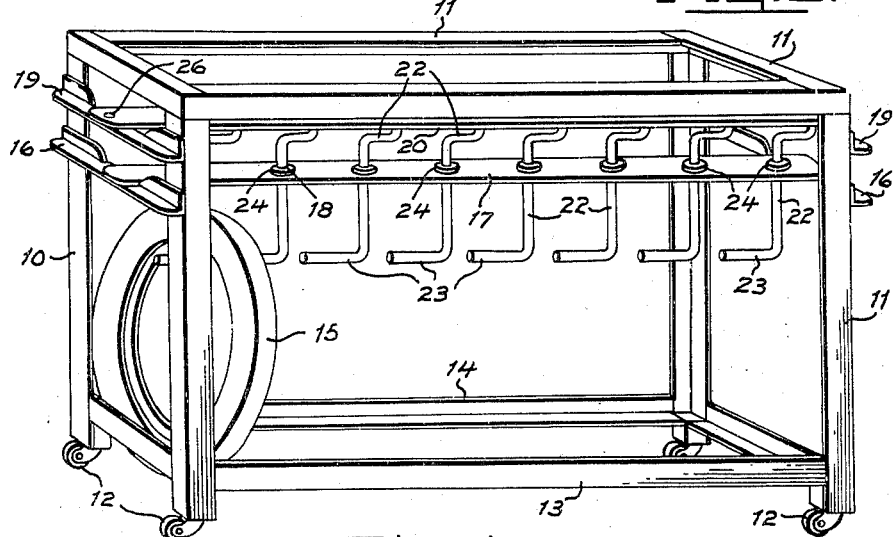

It will be seen that when the locking arms are perpendicular to the horizontal guide bar, tires may be placed in or removed from the tire rack easily. When the locking bar is moved to rotate the locking arms through a 90° angle, the ends of the locking arms project through the space within the inner circumference of each tire and in this position, it will be impossible to remove any tire from the rack. As shown in Figure 2 locking means are provided comprising padlock 25 passing through openings 26 in the locking bar and the framework to secure the locking bar in place when the arms are in the "locked" position.

It also will be apparent that the guide bar, locking bar and locking arm assembly which form the tire retaining feature of the invention may be used with many types of framework, varied both as to construction and material and moreover the locking assembly may be mounted at the top or bottom or even on the sides of the framework equally well, so long as the bent ends 23 of the locking arms are adapted to extend beyond the inner circumferences or rim bead of tires seated on the rack.

A further embodiment of the invention is illustrated in Figures 5 and 6 of the drawings which show a rack capable of supporting two rows of tires, one above the other. The framework in this case is extended vertically and a further pair of supporting members 27, 28 fixed to the framework carry a second row of tires 29. A second guide bar 30 is fixed to angles 31 on the ends of the framework and this bar carries a line of holes 32 corresponding to the holes 18 in the guide bar 17. Again the locking arms 33 are bent so that the vertical axis of the portion passing through the locking bar 20 is eccentric to the vertical axis of the portions passing through the guide bars 17 and 30. In this case both ends are bent approximately 90° from the vertical to form tire locking portions 23 and 34. As in the embodiment of Figures 1–4, washers 24 are employed to secure the locking arms from vertical movement. The operation of the embodiment of Figures 5 and 6 is similar to that of the embodiment previously described. Movement of the locking bar 20 by reason of the eccentric axes of the locking arms, results in the rotation of the arms 33 moving the locking portions 23, 34 of the arms in or out of "locked" position.

While the invention has been described in detail with respect to certain particular preferred examples and embodiments, it will be understood by those skilled in the art that various changes and modifications may be made without departing from the spirit and scope of the invention, and that the invention includes within its purview whatever changes and modifications fairly come within the scope of the appended claims.

I claim:

1. A lockable tire rack which comprises a framework adapted to support on edge at least one row of vehicular tires, horizontally disposed guide means fixed to the said framework carrying a plurality of vertically disposed locking arms, each of said arms being bent to provide a vertically disposed portion eccentric to the vertical axis of the arm at said guide means, said portion of the arm passing through a horizontally disposed bar, the movement of which causes the said arms to rotate about said vertical axes, the ends of the said arms being bent from the vertical to form locking portions, and lock means in association with said bar to secure said bar against movement when the bent ends of the said arms are positioned to prevent the removal of tires from the rack.

2. A lockable tire rack which comprises a framework adapted to support on edge at least one row of vehicular tires, a horizontally disposed guide bar fixed to the said framework carrying in spaced relationship along its length a plurality of vertically disposed locking arms, each of said arms being bent to provide a vertically disposed portion eccentric to the vertical axis of the arm at said guide bar, said portion of the arm passing through a second horizontally disposed bar, the movement of which causes the said arms to rotate about said vertical axes, the ends of the said arms being bent from the vertical to form locking portions, and lock means in association with said second bar to secure the said bar against movement when the bent ends of the said arms are positioned to prevent the removal of tires from the rack.

3. A lockable tire rack which comprises a framework adapted to support on edge at least one row of vehicular tires, a horizontally disposed guide bar fixed to the said framework carrying a plurality of vertically disposed locking arms spaced in a line along its length each from another a distance greater than the width of a tire to be supported, each of said arms being bent to provide a vertically disposed portion eccentric to the vertical axis of the arm at said guide bar, said portion of the arm passing through a second horizontally disposed bar, the movement of which causes the said arms to rotate about said vertical axes, the ends of the said arms being bent from the vertical to form locking portions, and lock means in association with the said bar to secure the said bar against movement when the bent ends of the said arms are positioned to prevent the removal of tires from the rack.

4. A lockable tire rack which comprises a framework adapted to support on edge and display a row of vehicular tires, a horizontally disposed guide bar fixed to the said framework, having a plurality of vertical holes spaced in a line along its length each from another a distance greater than the width of a tire to be supported, a horizontally disposed locking bar substantially parallel to the said guide bar, having a line of vertical holes correspondingly spaced to those of the said guide bar, a plurality of vertically disposed locking arms, each passing through a hole in the guide bar and the corresponding hole in the locking bar, the portion of each arm which passes through the said locking bar being bent so that the vertical axis of the arm at the locking bar is eccentric to the vertical axis of the said arm at the guide bar, and the tire locking ends of said arms bent to approximately 90° from the vertical, and lock means in association with the locking bar to secure the said bar against movement when the bent ends of the said arms are positioned to prevent the removal of tires from the rack.

References Cited in the file of this patent
UNITED STATES PATENTS

| | | |
|---|---|---|
| 1,355,033 | Cheape | Oct. 5, 1920 |
| 1,450,084 | Hull | Mar. 27, 1923 |
| 1,723,526 | Sanderson | Aug. 6, 1929 |